United States Patent Office 3,542,585
Patented Nov. 24, 1970

3,542,585
METHOD FOR ADHERING ACRYLATE FINISHES TO SILICONE IMPREGNATED LEATHER AND RESULTING ARTICLE
Roger J. Heit, Midland, Mich., assignor to Dow Corning Corporation, Midland, Mich., a corporation of Michigan
No Drawing. Filed Feb. 23, 1968, Ser. No. 707,457
Int. Cl. B44d 1/14, 1/32
U.S. Cl. 117—76                                6 Claims

ABSTRACT OF THE DISCLOSURE

Interpolymers of ethylacrylate, methylmethacrylate, glycidyl acrylates and gamma-acryloxypropylsilanes are used as primers for the adhesion of commercial acrylate finishes to silicone impregnated leather. An example of such a primer is an interpolymer of 60 parts of ethylacrylate, 20 parts methylmethacrylate, 10 parts glycidyl methacrylate, 10 parts gamma-methacryloxypropyltrimethoxysilane in 100 parts of ethylacetate.

---

Silicone materials, particularly those described in U.S. Pat. Re. 23,879, have met with outstanding commercial success in the treatment of leather to render that material water repellent. The silicone formulation described in said patent is used to impregnate leather and thereby render it resistant to penetration of water without at the same time sealing the leather to the passage of air. This has he unique advantage of keeping one's feet dry without having them encased in something equivalent to a rubber boot. In addition, the silicone prevents the leather from hardening after repeated exposure to water and even to salt water, or water containing other chemical reagents.

In spite of the excellent properties obtained by the use of such silicone leather treating materials, the market for such materials has been limited primarily to work shoes, sports boots, such as hunting boots, and to military boots. This is true, because to date it has not been possible to adhere the commercial acrylate finishes to leather which has been impregnated with organosiloxanes. Because of this lack such leather has not found any appreciable market for dress shoes.

It is the object of this invention to remedy this defect and to greatly expand the market and utility of silicone-impregnated leathers.

This invention relates to a method of promoting the adhesion of polyacrylate base finishes to silicone-impregnated leather which consists of applying to the grain side of the leather or to the buffed surface thereof, a film of an interpolymer of from 45 to 72 parts by weight ethylacrylate, from 12 to 30 parts by weight methylmethacrylate, from 5 to 20 parts by weight of glycidyl methacrylate or glycidyl acrylate and from 5 to 25 parts by weight of a silane of the formula

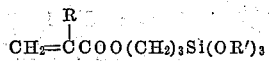

in which R is hydrogen or methyl and R' is a lower alkyl radical or a radical of the formula (—CH$_2$CH$_2$O)$_n$R" where R" is a lower alkyl radical and $n$ is an integer from 1 to 2 inclusive, and thereafter drying said film to a nontacky condition and then applying the acrylate finish.

This invention also relates to leather coated with the above interpolymer.

The monomers for the silicone-acrylate interpolymers are all well-known commercial materials and the interpolymers are prepared by standard commercial methods for preparing interpolymeric acrylate materials.

For the purpose of this invention the silane interpolymerized with the acrylate monomers can be any silane of the formula CH$_2$=CHCOO(CH$_2$)$_3$Si(OR')$_3$ or

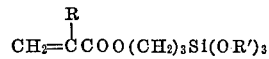

in which R' is any lower alkyl radical such as methyl, ethyl, isopropyl, or hexyl; or R' is any radical of the formula —(CH$_2$CH$_2$O)$_n$R" in which $n$ is 1 or 2 and R" is any lower alkyl radical such as methyl, ethyl or hexyl.

For the purpose of this invention leather means cowhide or its equivalent.

The primers can be applied to the leather substrate by any suitable means such as by airless spraying or roller coating. It is recommended but not critical, that the primer be applied in a concentration of 5% based on the weight of the primer solution. Suitable solvents for the primer are methyl Cellusolve, ethylacetate and other oxygenated solvents.

The primer is applied to the leather and thereafter dried to a tack-free condition before the commercial leather finish is applied.

Any commercial acrylate finish can be applied over the primers of this invention and good adhesion is thereby obtained. It is well-known that such finishes are polymers or interpolymers of acrylic or metharcrylic acids or the alkyl esters thereof.

The leather can be impregnated with any silicone material, but as is well-known the primary leather impregnating materials are methylsiloxanes which can also contain methylsiloxane resins and often catalysts such as titanate esters or zirconate esters. Any such silicone impregnating material is operative herein.

The adhesion tests employed to check the adherence of the finish to the prime surface is as follows: The finish is applied to the primed surface and dried. Then No. 1 Johnson and Johnson adhesive tape is pressed against the surface at a pressure of 3000 p.s.i. for 30 seconds. The tape is then pulled from the surface in a Keil tester and the percent of finish remaining on the leather is recorded. This percent is estimated visually.

The acrylate finish is applied to the surface in the following manner. A base coat composed of (1) 20 parts of a 35% polyethylacrylate emulsion sold solids by K. J. Quinn Company under the designation L669.86A,
(2) 20 parts of a black pigment in the form of an 18% solids dispersion in water, and
(3) 50 parts water is swabbed on the surface of the primed leather.

The coat is allowed to air-dry and a second coat is applied. After the second coat has air-dried a spray coat is applied, consisting of 60 parts of an acrylate lacquer WS691, 10 parts water and 10 parts of the base coat. One coat of the spray coat is applied and allowed to dry. The leather is then pressed 5 seconds at 3,000 p.s.i. at 185° F.

Thereafter a nitrocellulose lacquer K. J. Quinn LE399 was applied to the surface. The lacquer was 3 parts of nitrocellulose and 1 part ethylacetate. The lacquer was allowed to dry and then the above adhesion test was run.

The following examples are illustrative only and should not be construed as limiting the invention which is properly delineated in the appended claims. All parts are parts by weight.

EXAMPLE 1

The primer composition employed in this example was made by interpolymerizing 60 parts ethylacrylate, 20 parts methylmethacrylate, 10 parts glycidyl methacrylate, 10 parts $$CH_2=\overset{CH_3}{\underset{|}{C}}COO(CH_2)_3Si(OCH_3)_3$$

in 100 parts ethylacetate solvent. 1.5 parts dodecyl mercaptan was used as an end-stopper and 0.2 part of azo-bis-isobutyronitrile was used as a catalyst. The solution was refluxed at 80° C. for 3 hours and then diluted to 5% solid with the monomethylether of ethylene glycol.

The leathers to which this composition was applied were each impregnated with the composition of Example 2[1] of the aforesaid Pat. Re. 23,879, by dipping the leather into a 15% solution of the silicone composition. The leather was then removed and air-dried.

The following types of leather were then coated with the primer composition and thereafter with the finish shown above and the adhesion of the finish was checked by the Keil tester. Buffer leather of A. C. Lawrence had a finish retention of 100%, buffed leather of Armour had a retention of 100% and full grained leather of A. C. Lawrence had a retention of 100%. 100% means that none of the finish was pulled from the surface with the Johnson and Johnson tape. This indicates excellent adhesion between the finish and the leather substrate.

EXAMPLE 2

This example shows the effect of varying the formulation of the prime coating. In each case the prime coating used had the formulation shown below and in each case it was applied to leather which had been impregnated with the silicone composition of Example 1 and thereafter the commercial finish shown above was applied in the manner described. The adhesion of the finished coat was tested by the Keil tester and the results shown below. The leather employed in each case was A. C. Lawrence buffed leather.

Each primer formulation was prepared by heating a mixture of the ingredients shown in 100 g. of ethylacetate, from .5 to 1.5 g. of dodecylmercaptan and 0.2 g. of azo-bis-isobutyronitrile. The mixture was refluxed for 3 hours. The resulting interpolymer solution was diluted to 5% solids with the monomethylether of ethylene glycol.

| Monomers | Proportions of monomers in grams | | | | | | | |
|---|---|---|---|---|---|---|---|---|
| | A | B | C | D | E | F | G | H |
| $CH_2=\overset{CH_3}{\underset{|}{C}}COO(CH_2)_3Si(OCH_3)_3$ | 5 | 5 | 5 | 5 | 20 | 20 | 20 | 20 |
| Glycidylacrylate | 5 | ---- | 20 | ---- | 5 | ---- | 20 | ---- |
| Ethylacrylate | 70 | 72 | 45 | 45 | 45 | 45 | 48 | 48 |
| Methylmethacrylate | 18 | 18 | 30 | 30 | 30 | 30 | 12 | 12 |
| Glycidylmethacrylate | ---- | 5 | ---- | 20 | ---- | 5 | ---- | 20 |

ADHESION OF FINISH TO THE PRIMED SURFACE

| Sample | Lb./in. pull | Percent adhesion to leather |
|---|---|---|
| A | 555 | 100 |
| B | 589 | 100 |
| C | 643 | 100 |
| D | 540 | 100 |
| E | 510 | 100 |
| F | 542 | 100 |
| G | 501 | 90 |
| H | 483 | 3 |

EXAMPLE 3

Equivalent results are obtained when the following silanes are substituted in the interpolymers of Example 1.

$$CH_2=CHCOO(CH_2)_3Si(OCH_3)_3$$
$$CH_2=CHCOO(CH_2)_3Si(OC_2H_5)$$
$$CH_2=\overset{CH_3}{\underset{|}{C}}COO(CH_2)_3Si[(OCH_2CH_2)_2OCH_3]_3, \text{ and}$$
$$CH_2=CHCOO(CH_2)_3Si[OCH_2CH_2H_5]_3$$

[1] Tetra-2-ethylhexyltitanate as the titanium compound.

That which is claimed is:
1. A method of promoting adhesion of acrylic base finishes to silicone impregnated leather which consists of applying to the grain or buffed surface of the leather a coating of an interpolymer of from 45 to 72% by weight ethylacrylate, from 12 to 30% by weight methylmethacrylate, from 5 to 25% by weight of a silane of the formula $$CH_2=\overset{R}{\underset{|}{C}}COO(CH_2)_3Si(OR')_3$$

in which R is hydrogen or methyl, and R' is a lower alkyl radical or a radical of the formula $$-(CH_2CH_2O)_nR''$$

in which R'' is a lower alkyl radical and n is an integer from 1 to 2, and 5 to 20% by weight of glycidyl acrylate or glycidyl methacrylate, and thereafter allowing the coating to cure a nontacky condition, and then applying the acrylic finish to the coated leather.

2. The method of claim 1 in which R and R' are each methyl.

3. The method of claim 1 in which there is applied to the leather an interpolymer of about 60% by weight ethylacrylate, about 20% by weight methylmethacrylate, about 10% by weight of the silane of the formula $$CH_2=\overset{CH_3}{\underset{|}{C}}COO(CH_2)_3Si(OCH_3)_3$$

and about 10% by weight of glycidyl methacrylate.

4. A silicone inpregnated leather having a coating thereon of an interpolymer of from 45 to 72% by weight ethylacrylate, from 12 to 30% by weight methylmethacrylate, from 5 to 25% by weight of a silane of the formula $$CH_2=\overset{R}{\underset{|}{C}}COO(CH_2)_3Si(OR')_3$$

in which R is hydrogen or methyl, and R' is a lower alkyl radical or a radical of the formula—$(CH_2CH_2O)_nR''$ in which R'' is a lower alkyl radical and n is an integer from 1 to 2, and 5 to 20% by weight of glycidyl acrylate or glycidyl methacrylate, the aforesaid leather being finished with an acrylic finish, said interpolymer promoting the adhesion of the acrylic finish to the silicone inpregnated leather.

5. The leather of claim 4 in which R and R' are each methyl.

6. The leather of claim 4 in which the interpolymer is about 60% by weight ethylacrylate, about 20% by weight methylmethacrylate, about 10% by weight of the silane of the formula $$CH_2=\overset{CH_3}{\underset{|}{C}}COO(CH_2)_3Si(OCH_3)_3$$

and about 10% by weight of glycidyl methacrylate.

References Cited

UNITED STATES PATENTS

| Re. 23,879 | 9/1954 | Currie | 117—142 X |
| 2,879,178 | 3/1959 | McWherter et al. | 117—76 |
| 3,025,181 | 3/1962 | Nuessle et al. | 117—142 X |
| 3,398,210 | 8/1968 | Plueddemann et al. | |

WILLIAM D. MARTIN, Primary Examiner

R. HUSACK, Assistant Examiner

U.S. Cl. X.R.

117—65.2, 73, 135.5, 142, 161; 260—824